Aug. 21, 1934.  E. O. KAUP  1,970,855
BLOWER MOUNTING
Filed Dec. 5, 1932
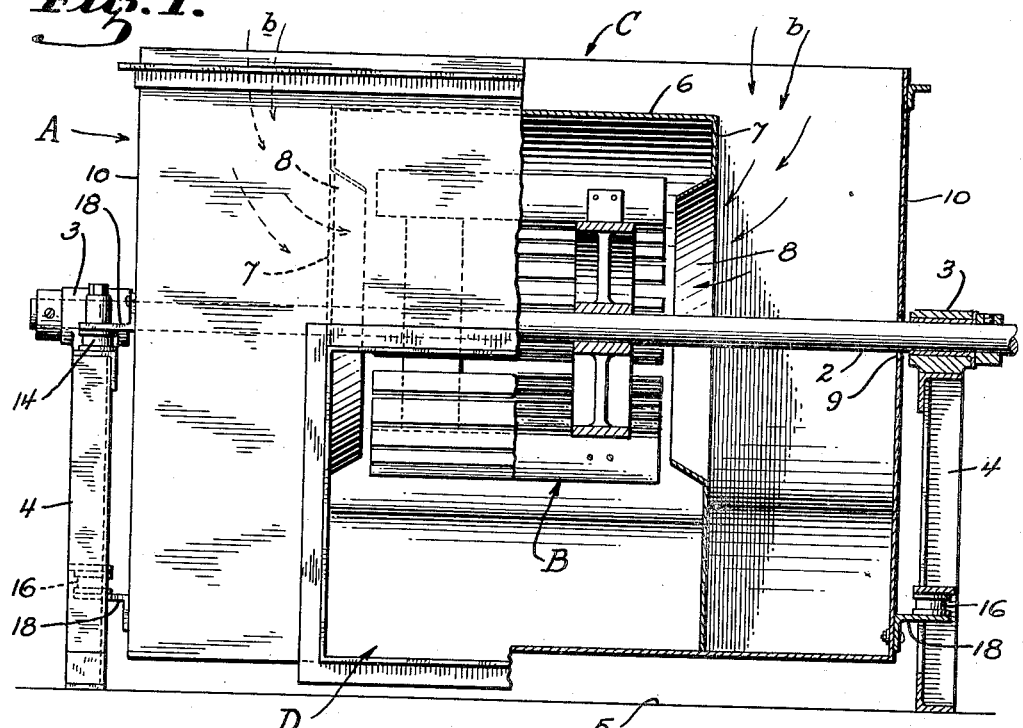
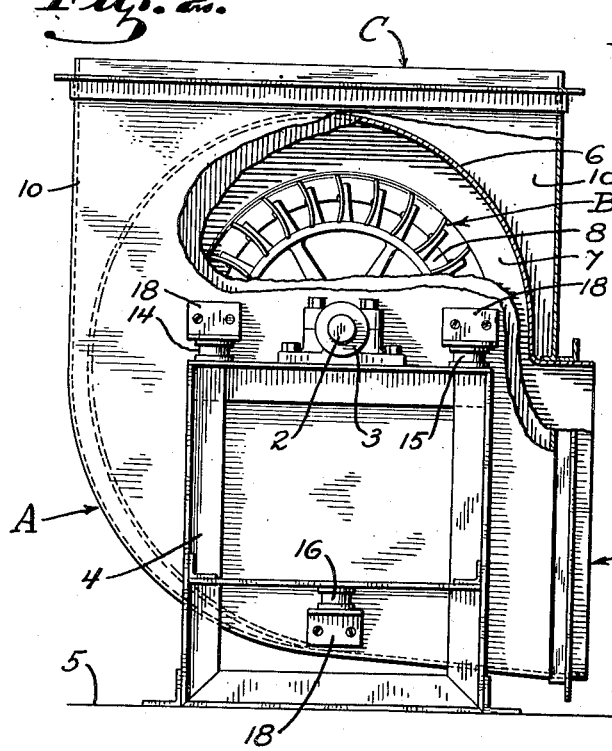
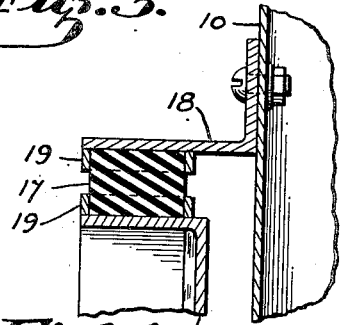
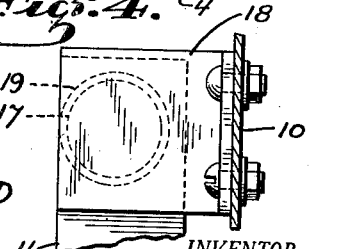
INVENTOR.
Edgar O. Kaup.
BY Townsend and Loftus.
ATTORNEYS.

Patented Aug. 21, 1934

1,970,855

UNITED STATES PATENT OFFICE 1,970,855

BLOWER MOUNTING

Edgar O. Kaup, Oakland, Calif., assignor to W. R. Ames Company, San Francisco, Calif., a corporation of California Application December 5, 1932, Serial No. 645,771

1 Claim. (Cl. 230—232)

This invention relates to a blower, or an air circulating ventilator or the like, and especially to a mounting whereby sound transmission caused by vibration and the like is prevented from entering the blower housing and the air ducts connected therewith.

In ventilating systems where air is circulating for heating, cooling, or other purposes, a power driven blower or fan is usually employed. The pipes or ducts conveying the air are connected with the housing of the blower, and as the ducts are excellent sound conductors, vibrations and other noises caused by the blower and the driving motor are transmitted through the ducts causing in many instances a noticeable and annoying hum or sound which is very objectionable in theatres, hospitals, etc., where absolute quiet is desired.

The object of the present invention is to generally improve and simplify the construction and operation of blower or ventilating units of the character described, and in particular to introduce a sound absorbing medium between the fan or rotor support and the housing surrounding the same whereby transmission of vibrations, or other noises, to the housing and connected air ducts will be eliminated.

The invention is shown by way of illustration in the accompanying drawing, in which—

Fig. 1 is a front view of a blower unit, said view being partly broken away and partly shown in section.

Fig. 2 is an end view of the blower unit shown in Fig. 1, said view being partly broken away and also partly shown in section.

Fig. 3 is an enlarged cross section of one of the resilient supports.

Fig. 4 is a plan view of Fig. 3.

Referring to the drawing in detail, and particularly Figs. 1 and 2, A indicates in general a blower housing and B the blower or fan mounted interior thereof. The blower is, in this instance, secured on a shaft 2 mounted in bearings 3—3, the shaft being driven in any suitable manner, either by a belt driven pulley or by a direct connected electric motor, or the like not here shown.

The bearings 3—3 are carried by end frames 4—4 bolted, or otherwise secured, to a concrete or other heavy foundation 5. The end frames also serve as a support for the blower housing A but an indirect semi-floating connection is made to reduce transmission of vibration from the rotating parts to the housing to a minimum; in fact, no direct connection is permitted between the housing, the end frames, or the rotating parts, as any direct connection would function as a sound conductor and as such would be very objectionable.

The construction whereby direct connections are avoided will now be described. By again referring to Figs. 1 and 2, it will be noted that an inner volute-shaped housing 6 is provided which encloses the blower B. This housing is provided with end walls 7—7 in which are formed inlet openings 8—8 to which air is directed through the upper open end of the housing A in the direction of arrows b—b. Ample clearance is provided between the rotating blower and the housing 6, and as the shaft 2 extends through the inlet openings 8—8 and also through openings 9—9 formed in the end walls 10—10 of the housing A, no contact either direct or indirect is made between the rotating parts and the housing; hence connections whereby sound transmission from the rotating parts to the housing could be transmitted have been entirely eliminated.

Direct connection between the housing A and the end frames 4—4 has also been prevented by providing semi-floating resilient sound absorbing supports at each end of the housing. These supports are best shown in Figs. 2, 3 and 4, and are generally indicated at 14, 15 and 16. The supports may be made of rubber or any other similar resilinet sound absorbing material, as indicated at 17, and they are interposed between the end frames and brackets 18 secured to the end walls 10—10 of the main housing A. The members 14 and 15 support the weight of the blower housing while the members 16 secure the housing against any up-thrust. The resilient sound absorbing members 17 are held in place by cups or rings 19 welded, or otherwise secured, to the frame and brackets 18 respectively, thus resiliently securing the housing against movement in any direction. By the resilient supports thus provided direct connection between the frame and the housing is avoided and sound transmission between the frame and the housing is, accordingly, reduced to a minimum, and as no connection whatsoever is made between the rotating parts of the housing sound transmission from that source can only be transmitted from the frame to the housing but as a resilient semi-floating support is provided between the frame and the housing such sound transmission is prevented.

In actual operation it may be supposed that the ventilator is employed in a heating system where air is continuously re-circulated. In that instance, the air ducts from the room, or rooms, to be heated and ventilated are connected with the upper open intake end C of the housing. The air enters in the direction of the arrows $b$ and passes through the inlet opening 8 into the ends of the blower. It is thrown outwardly by centrifugal action into the volute housing 6 and discharges therefrom through the lower opening indicated at D. This will be connected with a heating furnace of any suitable character and the heating furnace will, in turn, be connected by air ducts to the room, or rooms, to be heated and ventilated. Hence, there are two sets of ducts through which sound could be transmitted, but as the housing to which the ducts are connected is sound insulated with relation to the supporting frames 4 and also with relation to the rotating parts, absolute silence can be insured.

While certain features of the present invention are more or less specifically described, I wish it understood that various changes may be resorted to within the scope of the appended claim. Similarly, that the materials and finish of the several parts employed may be such as the manufacturer may decide, or varying conditions or uses may demand.

Having thus described my invention, what I claim and desire to secure by Letters Patent is—

A blower mounting comprising a pair of spaced frames, a blower housing disposed between the frames, a rotary blower within the housing, a driving shaft journaled on and supported by the frames, said shaft extending through the housing and supporting and rotating the blower, resilient sound and vibration absorbing means supporting the blower housing with relation to the frames, said means comprising brackets secured to the housing, and resilient sound and vibration absorbing blocks interposed between the brackets and the frames and resiliently supporting the housing with relation to the frames.

EDGAR O. KAUP.